United States Patent
Kahana

(10) Patent No.: US 9,825,968 B2
(45) Date of Patent: Nov. 21, 2017

(54) TECHNIQUES FOR DYNAMIC ENPOINT SECURE LOCATION AWARENESS

(75) Inventor: Uri Kahana, Givat-Ada (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,434

(22) PCT Filed: Sep. 28, 2011

(86) PCT No.: PCT/US2011/053701
§ 371 (c)(1),
(2), (4) Date: Jun. 26, 2013

(87) PCT Pub. No.: WO2013/048389
PCT Pub. Date: Apr. 4, 2013

(65) Prior Publication Data
US 2013/0283345 A1    Oct. 24, 2013

(51) Int. Cl.
*G06F 3/00* (2006.01)
*H04L 29/06* (2006.01)
*G06F 15/16* (2006.01)
*G06F 9/44* (2006.01)
*H04W 64/00* (2009.01)
*G01S 5/02* (2010.01)
*G06F 21/00* (2013.01)

(52) U.S. Cl.
CPC .......... *H04L 63/107* (2013.01); *G01S 5/0205* (2013.01); *G06F 9/44* (2013.01); *G06F 15/16* (2013.01); *G06F 21/00* (2013.01); *H04W 64/00* (2013.01); *G06F 2221/2111* (2013.01)

(58) Field of Classification Search
CPC . G06F 15/16; G06F 21/00; G06F 9/44; G06F 17/3087; G06F 17/30241; G06F 3/041; H04L 63/107; H04M 1/72572; H04W 4/02; H04W 48/16; H04W 4/18; H04W 4/22; H04W 76/02; H04W 12/08
USPC ........................................................ 726/1, 3
See application file for complete search history.

(56) References Cited

U.S. PATENT DOCUMENTS

| 6,832,093 | B1 * | 12/2004 | Ranta .................... H04W 48/04 455/422.1 |
| 7,308,703 | B2 | 12/2007 | Wright et al. |
| 2003/0044004 | A1 * | 3/2003 | Blakley .................... G06F 7/72 380/28 |

(Continued)

FOREIGN PATENT DOCUMENTS

| TW | 200414718 | | 8/2004 |
| WO | 03098525 | A1 | 11/2003 |

OTHER PUBLICATIONS

Search Report received for Taiwanese Patent Application No. 101132499, 2 pages English translation.

(Continued)

*Primary Examiner* — Baotran N To
*Assistant Examiner* — Sayed Beheshti Shirazi

(57) ABSTRACT

Techniques for dynamic endpoint secure location awareness may include dynamically sending a location query in response to a change in location for a mobile device. A location response may be received. The platform security engine may determine whether the mobile device is located in a secure location based on the location response. Other embodiments are described and claimed.

28 Claims, 10 Drawing Sheets

(56) References Cited

U.S. PATENT DOCUMENTS

| | | | |
|---|---|---|---|
| 2006/0009239 A1* | 1/2006 | Ogren | H04L 63/107 |
| | | | 455/456.6 |
| 2008/0092236 A1* | 4/2008 | Morgan | G06F 21/53 |
| | | | 726/22 |
| 2008/0133730 A1* | 6/2008 | Park | G01C 21/28 |
| | | | 709/223 |
| 2008/0168033 A1 | 7/2008 | Ott et al. | |
| 2009/0204807 A1* | 8/2009 | Bolin | H04L 63/0428 |
| | | | 713/155 |
| 2009/0248840 A1 | 10/2009 | Garg et al. | |
| 2009/0304009 A1* | 12/2009 | Kolhi | H04L 63/08 |
| | | | 370/400 |
| 2010/0037321 A1* | 2/2010 | Oz | G06F 21/57 |
| | | | 726/24 |
| 2010/0064341 A1* | 3/2010 | Aldera | H04L 63/102 |
| | | | 726/1 |
| 2010/0154060 A1 | 6/2010 | Demblewski | |
| 2011/0022313 A1* | 1/2011 | Bugnariu | G01C 21/343 |
| | | | 701/469 |
| 2011/0159862 A1* | 6/2011 | Jackson | G01S 5/02 |
| | | | 455/418 |
| 2011/0230201 A1* | 9/2011 | Hotes | G01S 5/0221 |
| | | | 455/456.1 |
| 2011/0230211 A1* | 9/2011 | Kim | G06F 21/71 |
| | | | 455/456.4 |
| 2012/0106738 A1* | 5/2012 | Belenkiy | H04L 9/0872 |
| | | | 380/270 |
| 2012/0146850 A1* | 6/2012 | Liu | G01S 19/34 |
| | | | 342/357.42 |
| 2012/0309376 A1* | 12/2012 | Huang | H04M 1/72572 |
| | | | 455/418 |
| 2013/0005350 A1* | 1/2013 | Campos | H04W 48/18 |
| | | | 455/456.1 |
| 2013/0295972 A1* | 11/2013 | Grusdat | H04W 68/02 |
| | | | 455/458 |
| 2014/0032635 A1* | 1/2014 | Pimmel | H04N 21/4126 |
| | | | 709/203 |
| 2014/0087708 A1* | 3/2014 | Kalita | H04W 4/04 |
| | | | 455/418 |

OTHER PUBLICATIONS

International Search Report and Written Opinion, dated Apr. 10, 2012, Application No. PCT/US2011/053701, Filed Date: Sep. 28, 2011, pp. 9.

* cited by examiner

600

SEND A POLICY QUERY TO
A PLATFORM SECURITY ENGINE
*602*

RECEIVE A POLICY INDICATION WITH INFORMATION
INDICATING WHETHER A MOBILE DEVICE IS
LOCATED IN A SECURE LOCATION
*604*

SET A SECURITY POLICY BASED ON THE POLICY INDICATION
FROM THE PLATFORM SECURITY ENGINE
*606*

ESTABLISH SECURE COMMUNICATION
702

RECEIVE A LOCATION QUERY
704

SEND A LOCATION RESPONSE
706

*FIG. 8*

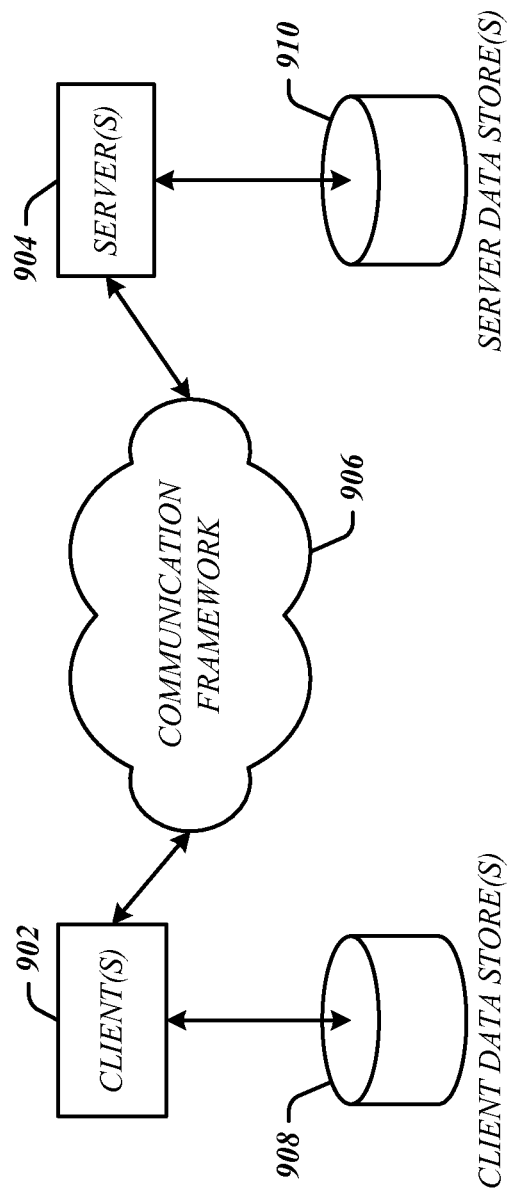

TECHNIQUES FOR DYNAMIC ENPOINT SECURE LOCATION AWARENESS

BACKGROUND

Devices such as, smart phones, laptops, tablets and/or netbooks may communicate with other devices through enterprise servers and/or the Internet. As the devices are mobile, they are constantly moved from one location to another. At each location, a security policy may be determined for the mobile device or endpoint. A mobile device may set a security policy based on a determination of whether a particular location is secure.

Currently, mobile devices use endpoint security software to determine the security level of the mobile device in a location. The mobile device may extract environmental factors or attributes such as an internet protocol address and/or a domain name server, to determine an appropriate security policy. However, the security software that is running on the mobile devices may be spoofed to trick a mobile device into determining that a location is secure when the mobile device is actually located in a non-secure location. This lying endpoint problem results in the mobile device having a lower security policy then what it should have in a non-secure location and leaves the mobile device open to various threats and attacks.

In addition to the endpoint spoofing problem, there is also a lack of standardization in location checking and information received by the mobile devices. Each security software independent service vendor implements their own methods and therefore, it is impossible to keep the same level of security with various mobile devices. This results in an inconsistent security policy which leaves a mobile device open to threats and/or attacks. It is with respect to these and other considerations that the present improvements have been needed.

BRIEF DESCRIPTION OF THE DRAWINGS

FIG. 7 illustrates an embodiment of a logic flow of setting a security policy.

FIG. 8 illustrates an embodiment of a logic flow of a location response.

FIG. 10 illustrates an embodiment of a communications architecture.

DETAILED DESCRIPTION

Figure 1:
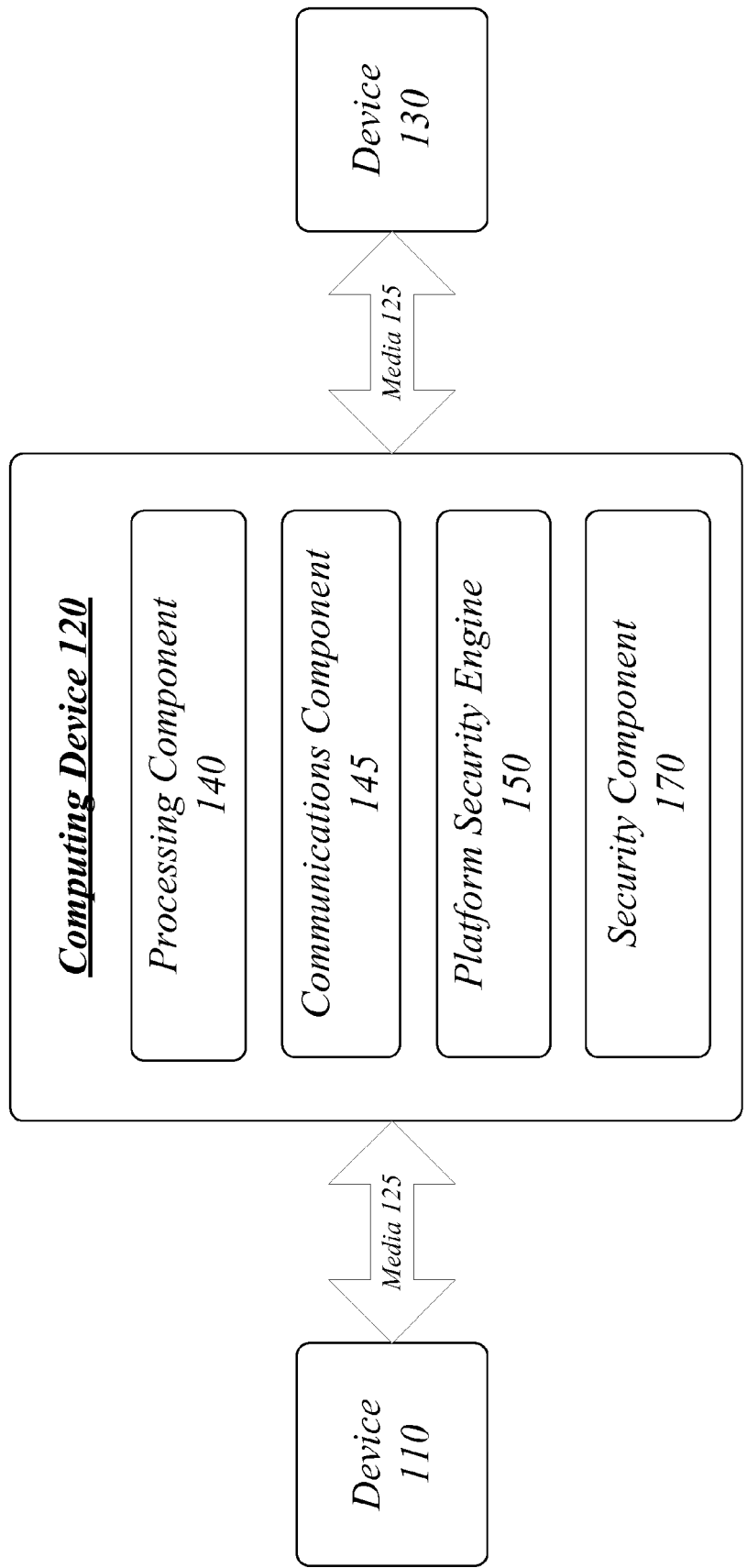
FIG. 1 illustrates an embodiment of a secure location awareness centralized system.

Various embodiments are directed to techniques for dynamic endpoint secure location awareness. Some embodiments are particularly directed to techniques for dynamically sending a location query in response to a change in location for a mobile device. A location response may be received. The platform security engine may determine whether the mobile device is located in a secure location based on the location response. Other embodiments are described and claimed.

In an embodiment, for example, a system may include a mobile device. The mobile device may include a processing circuit and a platform security engine. In an embodiment, the platform security engine may be utilized to dynamically send a location query in response to a change in location for a mobile device, receive a location response and determine whether the mobile device is located in a secure location based on the location response.

Using the platform security engine in a mobile device ensures that the mobile device has a secure location awareness capability. The platform security engine may provide a secure location awareness check. The platform security engine may be notified that the mobile device changed locations. The platform security engine may determine whether the mobile device is in a secure location through a common, trusted and secure system. The platform security engine may send a location query which is received by an independent service vendor server and/or a cloud computing server. The independent service vendor server and/or the cloud computing server may respond to the platform security engine's query. The independent service vendor server and/or the cloud computing server may communicate with the hardware on the platform security engine through software which was previously downloaded on the independent service vendor server and/or the cloud computing server. The independent service vendor server and/or the cloud computing server may provide a secure location response to the platform security engine indicating the location of the mobile device. The independent service vendor server may respond to the platform security engine stating that the mobile device is on a private network. The cloud computing server may respond to the platform security engine indicating that mobile device is on a public network. Based on the response, the platform security engine can determine whether the mobile device is in a secure location. The mobile device may determine that a private network is a secure location and that a public network is a non-secure location.

Based on the determination, the security component in the mobile device may query the platform security engine via an application program interface to determine the location status in order to set the security policy. The platform security engine may respond to the query indicating that the location is secure or that the location is not secure. Based on the response from the query, the security component may determine a security policy for the mobile device. The security policy may be a set of rules to protect, detect and/or remove possible attacks and/or threats to the mobile device. In an embodiment, a strict security policy with many rules may be set when the mobile device is in a non-secure location, such as a public network. The mobile device may set a more lenient security policy when the mobile device is in a secure location, such as a private network.

In an embodiment, the mobile device may dynamically send a query so that the mobile device can quickly determine when it is in a new location and the level of security in that location. For example, the platform security engine may dynamically determine that the mobile device has changed locations from a private network to a public network based on an event trigger from a communication component within the mobile device. As a result of the event trigger, the platform security engine may authenticate with an independent vendor server or a cloud computing server. As the platform security engine in the mobile device may authenticate prior to sending a location query to an independent service vendor server or a cloud computing server, the communication between the platform security engine and the mobile device may be secure. As the platform security engine determines whether the location is secure, the mobile device does not need to rely on environmental factors and/or attributes to determine whether the location is secure, and as a result, the endpoint location cannot be spoofed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram of a secure location awareness system 100. In one embodiment, the system 100 may comprise a communications system 100. Although the system 100 shown in FIG. 1 has a limited number of elements in a certain topology, it may be appreciated that the system 100 may include more or less elements in alternate topologies as desired for a given implementation.

In various embodiments, the communications system 100 may comprise a wireless communications system or a combination of both a wired communication system and a wireless communication system. For example, the communications system 100 may include one or more devices arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more devices arranged to communicate information over one or more types of wireless communication links, such as wireless shared media 150. The communication system 100 may have one or more devices 110, 120, 130. A device 110, 120, 130 generally may comprise any physical or logical entity for communicating information in a communications system 100. A device 110, 120, 130 may be implemented as hardware, software, or any combination thereof, as desired for a given set of design parameters or performance constraints. Although FIG. 1 may show a limited number of devices by way of example, it can be appreciated that more or less devices may be employed for a given implementation.

In an embodiment, a device 110, 120, 130 may be a computer-implemented system having one or more software applications and/or components. For example, a device 110, 120, 130 may comprise, or be implemented as, a computer system, a computing device, a computer sub-system, a computer, an appliance, a workstation, a terminal, a server, a personal computer (PC), a laptop, an ultra-laptop, a handheld computer, a personal digital assistant (PDA), a smart phone, a tablet computer, a gaming device, a set top box (STB), a television, a digital television, a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processing circuit such as general purpose processor, a graphics processor, an application processor, a digital signal processor (DSP) and/or a network processor, an interface, an input/output (I/O) device (e.g., keyboard, mouse, a display, a liquid crystal display (LCD), a touch screen display, printer, speakers), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In an embodiment, a device 110, 120, 130 may comprise, or be implemented as, software, a software module, an application, a program, a subroutine, an instruction set, computing code, words, values, symbols or combination thereof. A device 110, 120, 130 may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, micro-code for a network processor, and so forth. The embodiments are not limited in this context.

A device 110, 120, 130 may be a computing device 120. A computing device 120 may execute processing operations or logic for the system 100 using a processing component 140. In an embodiment, the processing component may be a processor executed by the personal area network and/or the wide area network. The processing component 140 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 120 may communicate with other devices, such as, but not limited to, device 110, 130, over a communications media 125 using communications signals via the communications component 145. By way of example, and not limitation, communications media 125 includes wired communications media and wireless communications media. Examples of wired communications media 125 may include a wire, cable, metal leads, printed circuit boards (PCB), backplanes, switch fabrics, semiconductor material, twisted-pair wire, co-axial cable, fiber optics, a propagated signal, and so forth. Examples of wireless communications media 115 may include acoustic, radio-frequency (RF) spectrum, infrared and other wireless media.

The computing device 120 may execute communications operations or logic using a communications component 145. The communications component 145 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 145 may include various types of standard communication elements, such as one or more communications interfaces, network interfaces, network interface cards (NIC), radios, wireless transmitters/receivers (transceivers), wired and/or wireless communication media, physical connectors, and so forth. In an embodiment, the communications component 145 may be operative on the processing circuit to communicate with a server. In an embodiment, the communication component may include a radio-frequency transceiver to communicate electromagnetic signals representing information.

The communications components 145 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context. When communications component 140 is implemented as software, the software may be executed by any suitable processor and memory unit.

The computing device 120 may include a platform security engine 150 and a security component 170. The platform security engine 150 may provide secure location awareness. In an embodiment, the platform security engine 150 may dynamically send a location query. The platform security engine 150 may receive location responses. In an embodiment, a location response may indicate that computing device 120 is on a private network, such as, but is not limited to, a corporate or an enterprise network. In an embodiment, a location response may indicate that a computing device 120 is on a public network, such as, but is not limited to, the Internet. Based on the location response, the platform security engine 170 may determine whether the computing device 120 is in a secure location.

In an embodiment, the security component 170 may set a security policy based on the location of the computing device 120. In an embodiment, the security component 170 may adjust the security policy of the computing device 120. In an embodiment, the security component may include security software and the security policy may be adjusted by changing the configuration of the security software. The security policy may be a set of rules to protect, detect and/or remove possible attacks and/or threats to the computing device 120. In an embodiment, the security policy may include a few rules and be a lenient security policy when the computing device 120 is in a secure location, such as a private network, since a secure location provides protections from attacks and/or threats. In an embodiment, the security policy may include a strict security policy with many rules when the computing device 120 is in a non-secure location, such as a public network, in order to protect the computing device 120 from attacks and/or threats.

Figure 2:
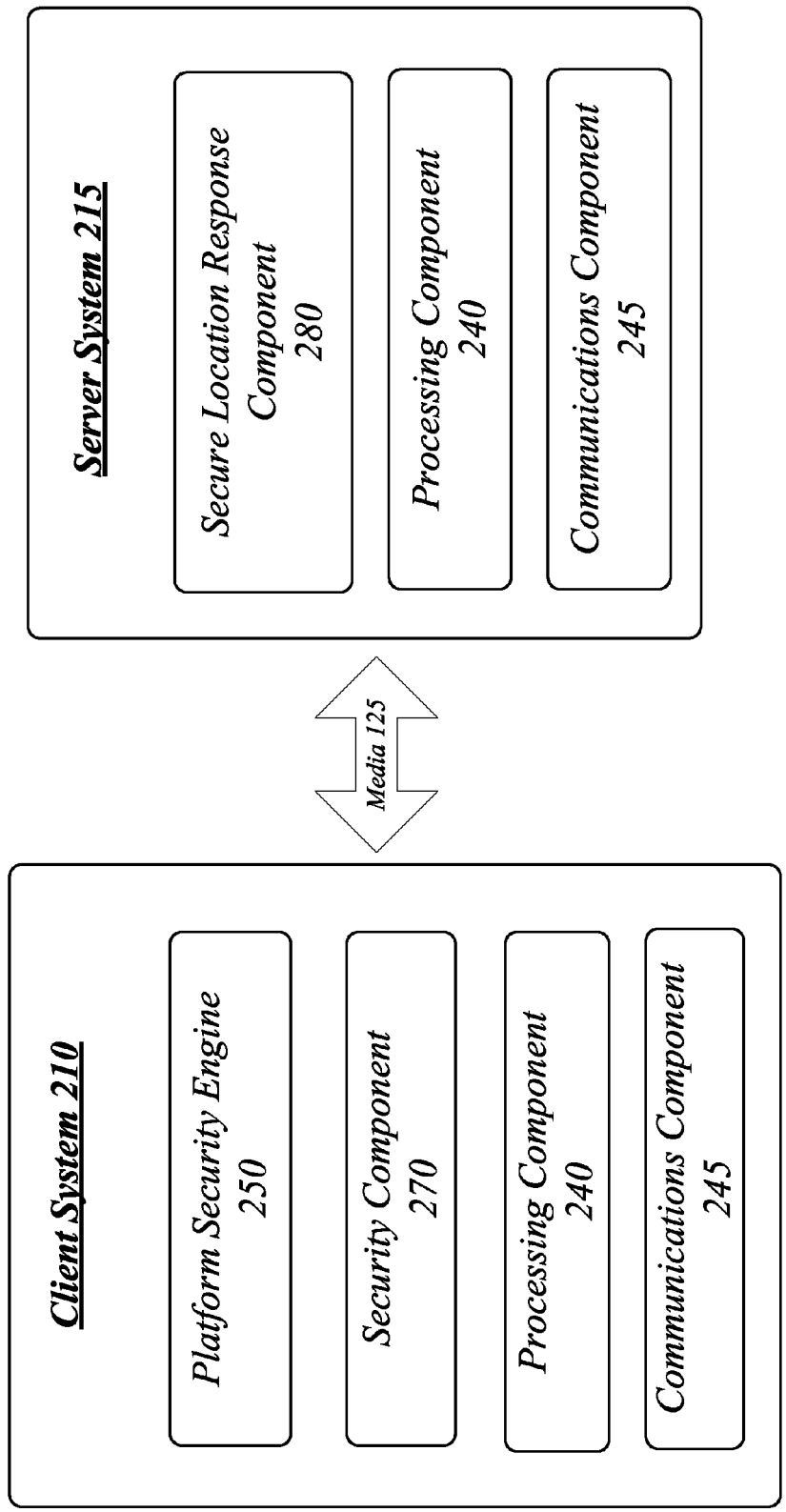
FIG. 2 illustrates a block diagram of a secure location awareness distributed system.

FIG. 2 illustrates a block diagram of a secure location awareness distributed system 200. The distributed system 200 may distribute portions of the structure and/or operations for the systems 100 across multiple computing entities. Examples of distributed system 200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 210 and the server system 215 may process information using the processing components 240, which are similar to the processing component 140 described with reference to FIG. 1. The client system 210 and the server system 215 may communicate with each over a communications media 220 via communications components 245, which are similar to the communications component 145 described with reference to FIG. 1.

In one embodiment, for example, the distributed system 200 may be implemented as a client-server system. A client system 210 may include a platform security engine 250 and a security component 270. In an embodiment, the client system 210 may include a platform security engine 250 which is similar to the platform security engine 150 described with reference to FIG. 1. The client system 210 may include a security component 270 which is similar to the security component 170 described with reference to FIG. 1.

In an embodiment, a platform security engine 250 may include both hardware elements and software elements. The platform security engine 250 may include architecture hardware security engines. For example, the platform security engine may include the management engine available on a netbook. The platform security engine 250 may communicate with a server system 215. Through this communication, the platform security engine 250 may provide secure location awareness to the client system 210.

In an embodiment, the security component 270 may include software elements which set the security policy for the computing device 120. In an embodiment, the security component 170 may include security software that provides protection to the client system 210. In an embodiment, the security component 270 may include endpoint security software. In an embodiment, the security component 270 may include, but is not limited to, a personal firewall, host data loss prevention (DLP) software, host intrusion prevention software (IPS), and/or antivirus software to implement one or more rules based on the location of the mobile device. For examples, the security component 270 may include, but is not limited to, a McAfee® personal firewall or a Checkpoint® host DLP. In an embodiment, the security component 270 may set a security policy based on the location of the mobile device determined by the platform security engine. The security policy may be a set of rules to protect, detect and/or remove possible attacks and/or threats to the mobile device. In an embodiment, the security policy may be a set of personal firewall rules that allow, block ingress or egress traffic to the mobile device. In an embodiment, the security policy may include a few rules and be a lenient security policy when the mobile device is in a secure location. A secure location may be a trusted network. A secure location may have measures to protect the mobile device from attacks and/or threats. Accordingly, the mobile device does not need to implement a strict security policy in a secure location. The mobile device may have a simpler and/or lighter protection scheme when located in a secure location.

In an embodiment, the security policy may include a strict security policy with many rules when the mobile device is in a non-secure location. A non-secure location may be an un-trusted network. A non-secure location may have few or no protection against attacks from other devices. For example, if the mobile device is on a private network, then the security policy may include fewer rules than if the mobile device is on a public network. The mobile device may have a security policy with a stringent protection scheme when located in a non-secure location.

In various embodiments, the client system 210 may comprise or employ one or more client computing devices and/or client programs that operate to perform various methodologies in accordance with the described embodiments.

In various embodiments, the client system 210 may comprise one or more of the devices discussed with regards to the devices 110, 120 and 130 in FIG. 1. In particular, the client system may be implemented as a mobile device such as, but not limited to, a laptop, a handheld computer, a personal digital assistant (PDA), a smart phone, a tablet computer, a notebook, an ultrabook and a netbook. The mobile device may be a mobile endpoint that can roam between various locations and networks.

In an embodiment, a server system 215 may implement a secure location response component 280. In an embodiment, the secure location response component 280 may include software that will allow communication between the client system 210 and the platform security engine 250. In an embodiment, the software may be installed, downloaded and/or run on the server system 215.

In various embodiments, the server system 215 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 215 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

In an embodiment, the platform security engine 250 may determine a location of the client system 210 by dynamically sending a query. In an embodiment, prior to a platform security engine 250 sending a location query, the platform security engine 250 of the client system 210 and the server system 215 may establish secure communication. In an embodiment, the platform security engine 250 of the client system 210 may authenticate with the server system 215. For example, the platform security engine 250 may authenticate using public/private asymmetric Rivest, Shamir Adleman (RSA) keys. Public/private asymmetric RSA keys may be generated by the private key infrastructure of the server system 215. In an embodiment, usage of keys for authentication can provide secure communication between the platform security engine 250 in the client system 210 and the server system 210.

In an embodiment, after authentication, the platform security engine 250 may send a query to the server system 215. The server system 215 may respond to the query. In an embodiment, the secure location response component 280 in the server system may include software elements that are run on the server system 215 in order to communicate with the platform security engine 250. In an embodiment, software may be downloaded by the server system 215 prior to communication with the platform security engine 250. The secure location response component 280 in the server system 215 may receive and respond to the query.

The secure location response component 280 in the server system 215 may send a response with information about the location of the client system 210. For example, the sever system 215 may send a response stating that the client system 210 is on a private network, such as, but is not limited to, a corporate or enterprise network. For example, the server system 215 may send a response stating that the mobile device is on a public network, such as, but is not limited to, the Internet.

Based on the response, the platform security engine 250 of the client system 210 can determine whether the client system 210 is located in a secure location. As the platform security engine 250 of the client system 210 may securely communicate with the server system 215, the client system 210 cannot be tricked, by environment factors or attributes, such as a fake internet protocol address, into determining that the client system 210 is located in a secure location when in fact the client system 210 is located in a non-secure location.

After the platform security engine 250 determines whether the location is secure, the security component 270 may query the platform security engine 250 to obtain the location status of the client device 210.

Figure 3:
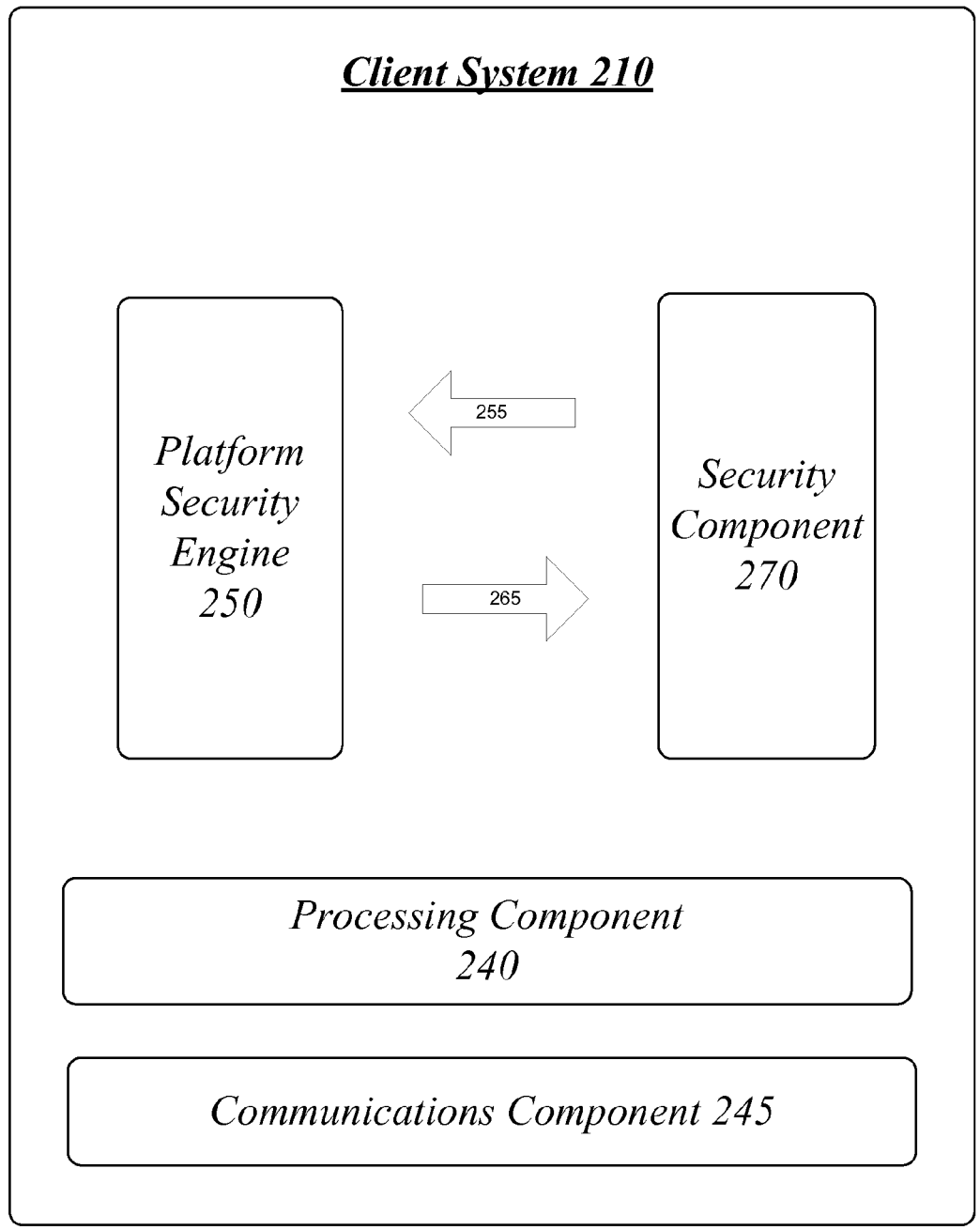
FIG. 3 illustrates a block diagram of an exemplary distributed system with communication between a platform security engine and a security component.

FIG. 3 illustrates a block diagram of an exemplary distributed system with a communication between a platform security engine 270 and a security component 270. In an embodiment, the security component 270 may send a policy query 255 to the platform security engine 250 via an application program interface. Using the application programming interface, the security component 270 may send a policy query 255 to the platform security engine 250 and dynamically obtain whether a client device 210 is in a secure location or a non-secure location. In other words, the security component 270 may dynamically identify whether the network is trusted or not based on the response to the query.

The platform security engine 250 may send a policy indication 265 to the security component 270. In an embodiment, the policy indication 265 may be a policy response. In an embodiment, the policy indication 265 may include information indicating whether the client system 210 is located in a secure location. For example, the policy indication 265 may state that the client system 210 is in a secure location. In an embodiment, the platform security engine 250 may send a policy indication 265 indicating whether the client system 210 is located in a secure location based on the query and indication sent between the platform security engine 250 and the server system 215.

Unlike non-secure location awareness systems, the security component 270 may not do the decision making and network trust evaluation. Instead, the platform security engine 250 may determine whether the location is secure and may communicate the location status, such as whether the location is secure, to the security component 270.

Figure 4:
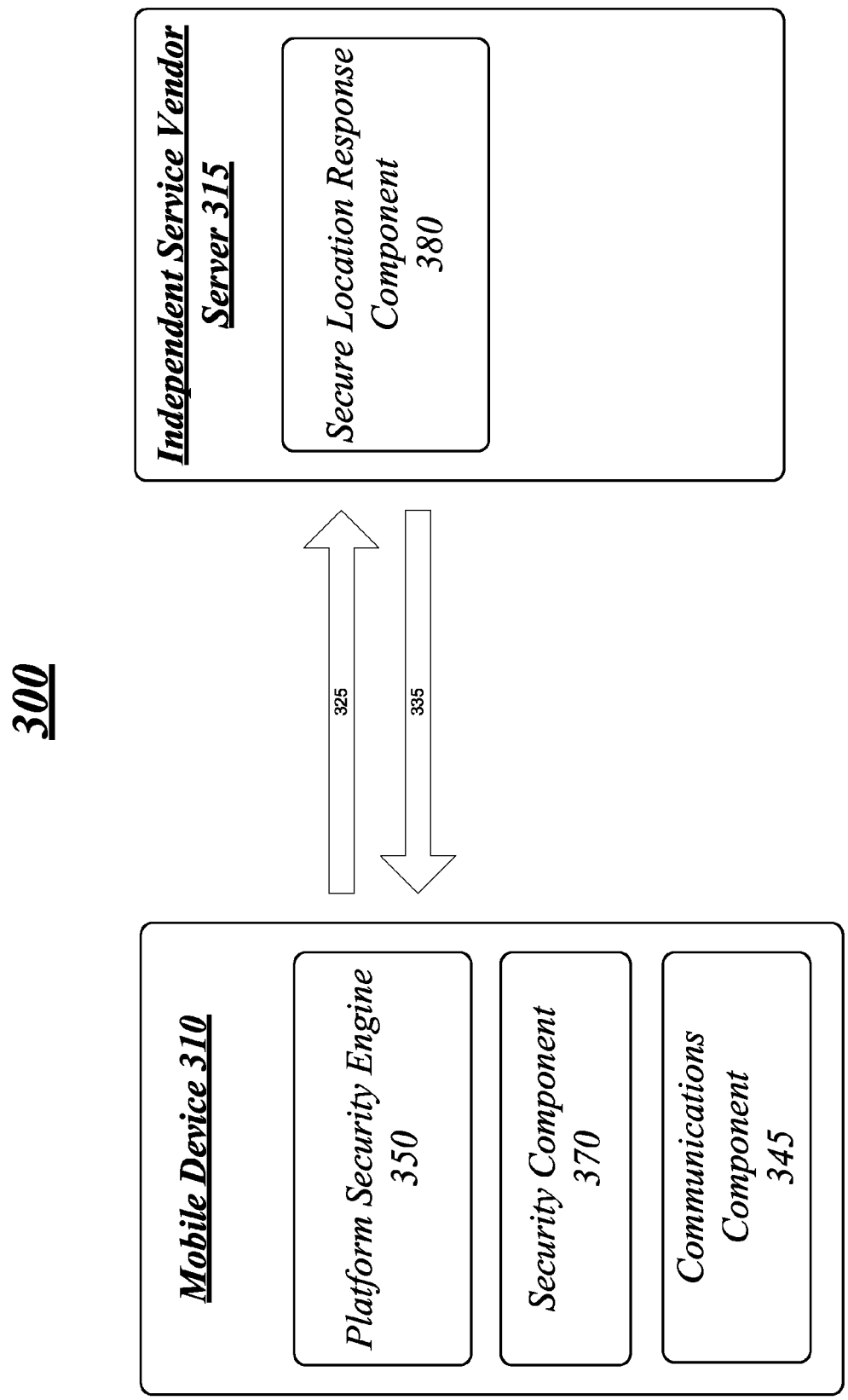
FIG. 4 illustrates a block diagram of an exemplary distributed system with a mobile device and an independent software vendor server.

FIG. 4 illustrates a block diagram of an exemplary distributed system with a mobile device 310 and an independent software vendor server 315. In an embodiment, the sever system may be an independent service vendor server 315. In an embodiment, the mobile device 310 may include a platform security engine 350 which is similar to the platform security engine 150, 250 described with reference to FIGS. 1 and 2. The mobile device 310 may include a security component 370 which is similar to the security component 170, 270 described with reference to FIGS. 1 and 2. In an embodiment, the independent service vendor server 315 may include a secure location response component 380 which is similar to the secure location response component 280 described with reference to FIG. 2.

In an embodiment, the independent service vendor server 315 may be an enterprise level server. In an embodiment, the independent service vendor server 315 may be a McAfee® server, an Intel® server or other server. In an embodiment, the vendor of the enterprise level server may include a secure location response component 380 in order to communicate with the platform security engine 350 of the mobile device 310. In an embodiment, the secure location response component 380 may be software that was previously downloaded onto the independent service vendor server 315. In an embodiment, the secure location response component 380 may be software that runs on the independent service vendor server 315.

In an embodiment, the platform security engine 350 may initiate communication with the independent service vendor server 315. In an embodiment, a platform security engine 350 may communicate with an independent service vendor sever 315 using secure communication. In an embodiment, a secure location response component 380 in the independent service vendor server 315 may communicate using a secure connection with the platform security engine 350 in the mobile device 310. In an embodiment, the communication between the mobile device 310 and the independent service vendor server 315 may use encryption. In an embodiment, the communication between the mobile device 310 and the independent service vendor server 315 may use a certificate and/or a RSA key pair. For example, a platform security engine 350 may have access to a private key or other method of encryption in order for the platform security engine 350 to communicate with the independent service vendor server 315. In an embodiment, the platform security engine 350 may use a generated RSA key pair for authentication with the independent service vendor server 310. In an embodiment, the platform security engine 350 may try to establish a secure socket layer (SSL) connection to a predefined fully qualified domain name (FQDN) that is resolvable inside a corporate network to the independent service vendor server IP.

In an embodiment, the platform security engine 350 may authenticate using a predefined address. In an embodiment, secure communication may be established using a uniform resource locator and/or a fully qualified domain name. For example, a fully qualified domain name may include, but is not limited to, https://www.sla.com.

In an embodiment, the platform security engine 350 may dynamically send a location query 325 which is received by the independent service vendor server 315. In an embodiment, a platform security engine 350 may send a location query 325 based on an event trigger. In an embodiment, platform security engine 350 may send a location query 325 when the communications component 345 identifies a change in location. For example, a Network Interface Card (NIC) may identify a new location or network and notify the platform security engine 350 using an event trigger. Based on the event trigger, the platform security engine 350 may send a location query 325. For example, the communications component 345 may identify a change in location based on the endpoint routing table. Based on the event trigger, the platform security engine 350 may perform a secure location check by dynamically sending a location query 325. The embodiments are not limited in this context.

In an embodiment, the secure location response component 380 in the independent service vendor server 315 may send a response 335 to the platform security engine 350. In an embodiment, the location response 335 from the independent service vendor server 315 may provide information about the current location of the mobile device 310. For example, the independent service vendor server 315 may provide information in the location response 335 indicating that the mobile device 310 is located on a private network, such as, but is not limited to a corporate or an enterprise network. In an embodiment, the private network may be an office. A private network may be determined by the platform security engine 350 to be a secure location and/or environment as a private network may have secure firewalls, encryption and/or other types of security to prevent the mobile device from external attacks and threats. In an embodiment, based on the location response 335 indicating that the mobile device 310 is in a private network, the mobile device 310 may determine that it is located in a secure location.

Based on the location, a security policy may be set for the mobile device 310. The security policy may be a set of rules to protect, detect and/or remove possible attacks and/or threats to the mobile device 310. The security component 370 may determine a security policy for the mobile device 310 based on whether the mobile device 310 is in a secure location, such as a private network, or a non-secure location, such as a public network or a non-secure location, such as the Internet.

In an embodiment, the security component 370 may include software elements which set and/or change a configuration of the security policy for the mobile device 310. In an embodiment, the security component 370 may include security software that provides protection to the mobile device 310. In an embodiment, the security component 370 may set a security policy based on the location of the mobile device 310 determined by the platform security engine 350.

In an embodiment, the security component 370 may query the platform security engine 350 via an application program interface. Using the application programming interface, the security component 370 may query the platform security engine 350 and dynamically identify whether mobile device 310 is in a secure location or a non-secure location. The security component 370 may use the response query from the platform security engine 350 to learn whether the location is secure or non-secure. The security component 370 may implement a security policy based on the determination of a platform security engine 350. In an embodiment, the security component 370 may set a lenient security policy with a few rules when the mobile device 320 is in a secure location.

In an embodiment, based on the location, communication settings and/or hardware setting may be adjusted on the mobile device 310. In an embodiment, types of communications may be limited when the mobile device 310 is in a non-secure location. In an embodiment, communication rates may be reduced when the mobile device 310 is in a non-secure location. In an embodiment, the hardware setting may be reduced when the mobile device 310 is in a non-secure location. For example, in an embodiment, power consumption may be reduced when the mobile device 310 is in a non-secure location.

Figure 5:
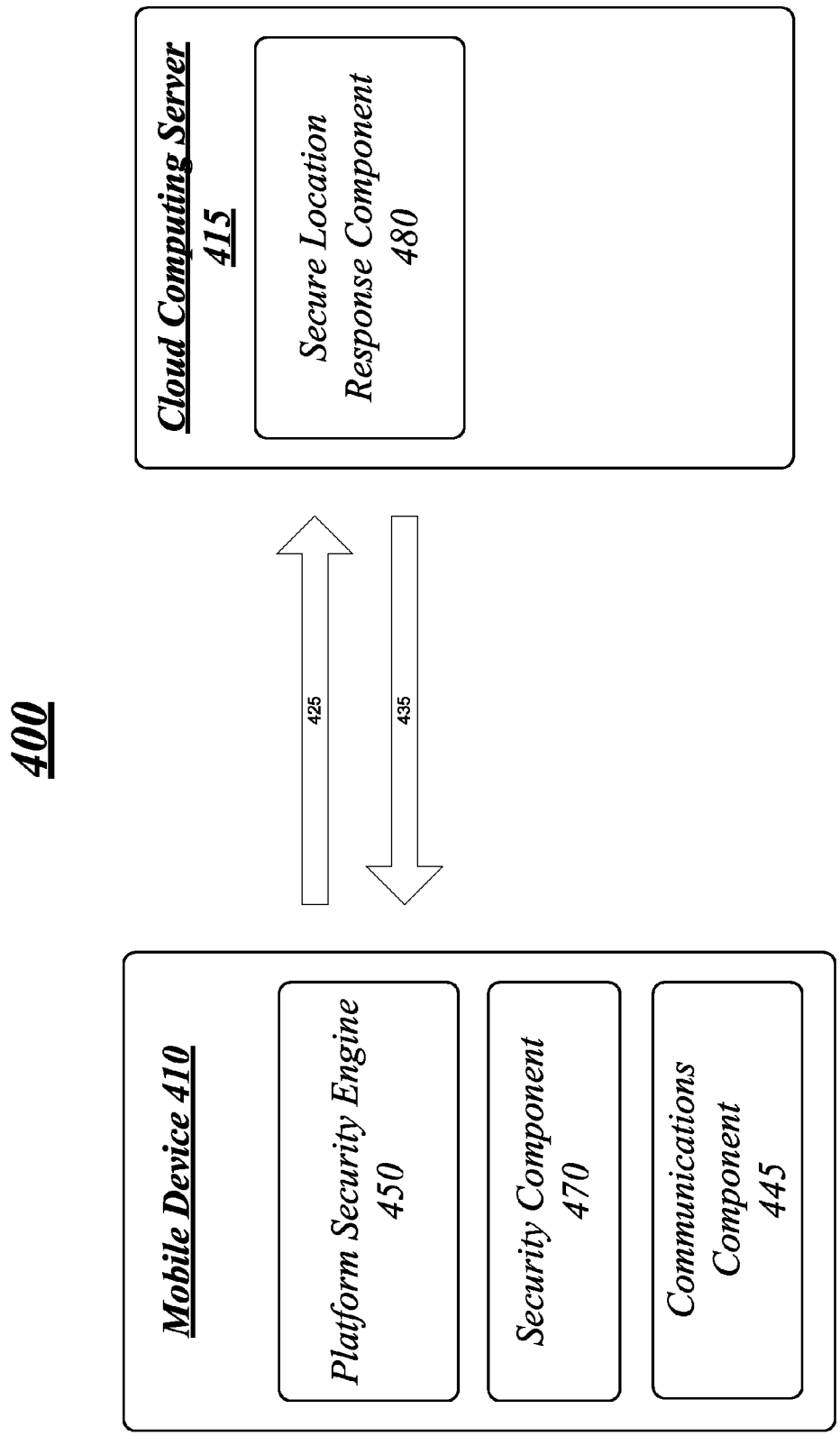
FIG. 5 illustrates a block diagram of an exemplary distributed system with a mobile device and a cloud computing server.

FIG. 5 illustrates a block diagram of an exemplary distributed system with a mobile device 410 and a cloud computing server 415. In an embodiment, the mobile device 410 may include a platform security engine 450 which is similar to the platform security engine 150, 250, 350 described with reference to FIGS. 1-4. The mobile device 410 may include a security component 470 which is similar to the security component 170, 270, 370 described with reference to FIGS. 1-4. In an embodiment, the cloud computing server 415 may include a secure location response component 480 which is similar to the secure location response component 280, 380 described with reference to FIG. 2 and FIG. 4.

In an embodiment, the platform security engine 450 in the mobile device 410 may communicate with a cloud computing server 415. In an embodiment, a cloud computing server may deliver applications via a public network, such as, but is not limited to, the Internet. In a cloud computing environment, data may be stored in a server in a data center at a remote location. In an embodiment, the cloud may include a MacAfee cloud with a MacAfee data center with MacAfee servers and/or an Intel cloud with an Intel data center with Intel servers. The example is not limited to these computing clouds, data centers and servers.

In an embodiment, a server in the data center may include the secure location response component 480. In an embodiment, the secure location response component 480 may be software that was previously downloaded onto a cloud computing server 415. In an embodiment, the secure location response component 480 may be software that runs on the cloud computing server 415.

In an embodiment, a platform security engine 450 may communicate with a cloud computing server 415 using secure communication. In an embodiment, a secure location response component 480 in a cloud computing server 415 may securely communicate with the platform security engine 450 in the mobile device 410. As discussed with the communication between an independent service vendor server 350 and a platform security engine 350, the cloud computing server 415 may communicate using a secure connection with the platform security engine 450. In an embodiment, the communication between a mobile device 410 and a cloud computing server 415 may use encryption, a certificate and/or a RSA key pair. For example, a platform security engine 450 may use a generated RSA key pair for authentication with a cloud computing server 415.

In an embodiment, the platform security engine 450 may securely communicate with a cloud computing server 415 using a predefined address, a uniform resource locator and/or a fully qualified domain name. For example, a fully qualified domain name may include, but is not limited to, https://www.sla.com. In an embodiment, the fully qualified domain name may be resolved outside a cloud computing environment.

In an embodiment, the platform security engine 450 may dynamically send a location query 425. For example, the platform security engine 450 may dynamically send a location query 425 which is received by a cloud computing server 415. In an embodiment, a platform security engine 450 may send a location query 425 based on an event trigger. In an embodiment, platform security engine 450 may send a location query 425 when the communications component 445 identifies that the mobile device changed locations. For example, a Network Interface Card (NIC) may identify that a change in network took place and notify the platform security engine 450 using an event trigger. For example, the communications component 445 may identify a change in location based on the endpoint routing table. Based on the event trigger, the platform security engine 450 may perform a secure location check and dynamically send 425 a location query which is received by a cloud computing server 415. In an embodiment, by a triggering event causing the mobile device 410 to query a secure location response component 480 in a cloud computing server 415, the platform security engine 450 may dynamically determine when the mobile device 410 has changed locations.

In an embodiment, the secure location response component 480 in a cloud computing server 415 may send a response 435 to the platform security engine. In an embodiment, a cloud computing server 415 may be a server located in a data center which provides a public network with little or no security. Unlike an independent service vendor server which provides a secure private network at an office, the cloud computing server 415 may provide non-secure public network at a coffee shop, a user of the mobile device's home, an airport, and other possible non-secure locations.

In an embodiment, the location response 435 from the cloud computing server 415 may provide information indicating that the mobile device 410 is located on a public network, such as, but is not limited to, the Internet. For example, the mobile device 410 may receive a location response 435 from the cloud computing server 415. In an embodiment, the location response 435 from the cloud computing server 415 may include information that the mobile device 410 is located on a public network. A public network may be determined by the platform security engine 450 to be a non-secure location and/or environment as the public network may not have any security to prevent the mobile device 410 from external attacks and threats.

In an embodiment, based on the location response 435 indicating that the mobile device 410 is on a public network, the mobile device 410 may determine that it is located in a non-secure location. A public network may be determined to not be a secure location as a public network may have few or no protection against attacks from other devices, such as, but not limited of a denial of service attack. A mobile device 410 on a public network may have a high risk of intrusion and or fraud from malware, such as, but not limited to viruses, Trojan horses and/or spyware.

Based on the location, a security policy may be set for the mobile device. The security policy may be a set of rules to protect, detect and/or remove possible attacks and/or threats to the mobile device 410. The security component 470 may set a security policy for the mobile device 410 based on whether the mobile device 410 is in a secure location, such as a private network, or a non-secure location, such as a public network or a non-secure location, such as the Internet.

In an embodiment, the security component 470 may include software elements which set the security policy for the mobile device 410. In an embodiment, the security component 470 may include security software that provides protection to the mobile device 410. In an embodiment, the security component may include endpoint security software. In an embodiment, the security component 470 may set a security policy based on the location of the mobile device 410 determined by the platform security engine 450.

In an embodiment, the security component 470 may query the platform security engine 450 via an application program interface. Using the application programming interface, the security component 470 may query the platform security engine 450 and dynamically identify whether mobile device 410 is in a secure location or a non-secure location. The security component 470 may use the response query from the platform security engine 450 to learn whether the location is secure or non-secure and the security component 470 may implement a security policy based on the determination of a platform security engine 450. In an embodiment, the security component 470 may set and/or adjust the security policy. The security component 470 may set a strict security policy with many rules when the mobile device 420 is in a non-secure location.

In an embodiment, based on the location, communication settings and/or hardware setting may be adjusted on the mobile device 410. In an embodiment, types of communications may be limited when the mobile device 410 is in a non-secure location. In an embodiment, communication rates may be reduced when the mobile device 410 is in a non-secure location. In an embodiment, the hardware setting may be reduced when the mobile device 410 is in a non-secure location. For example, in an embodiment, power consumption may be reduced when the mobile device 410 is in a non-secure location.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
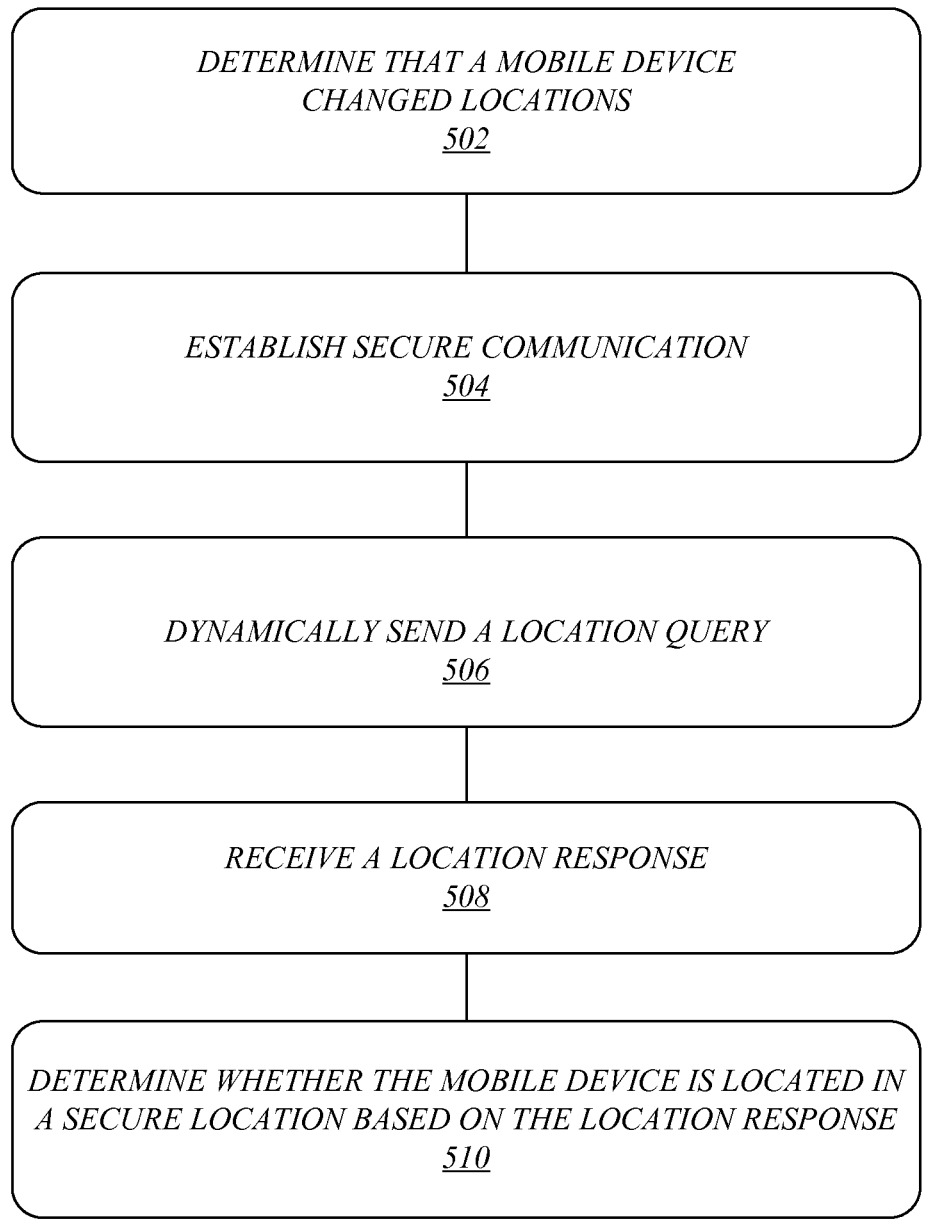
FIG. 6 illustrates an embodiment of a logic flow of determining a secure location.

FIG. 6 illustrates an embodiment of a logic flow 500 of determining a secure location. The logic flow 500 may be representative of some or all of the operations executed by one or more embodiments described herein.

In the illustrated embodiment shown in FIG. 6, the logic flow 500 determines that a mobile device changed locations at block 502. In an embodiment, the platform security engine 250 may determine that a mobile device changed locations by receiving an event trigger. In an embodiment, the platform security engine 250 may receive an event trigger which notifies the platform security engine that the mobile device 210 changed locations. In an embodiment, a communications component 245, such as, but not limited to a network interface card, may determine that the mobile device 210 has changed locations. In an embodiment, the communications component 245 may send an event trigger to a platform security engine 250 to notify the platform security engine 250 of the change in location of the mobile device 210.

In an embodiment, the logic flow 500 establishes secure communication at block 504. In an embodiment, establishes secure communication from a platform security engine of a mobile device. In an embodiment, the secure communication may include encryption, a certificate and/or a RSA key pair. In an embodiment, secure communication may be established using a secure socket layer (SSL) connection. In an embodiment, the secure communication may use a unique uniform resource locator or a predefined fully qualified domain name.

In an embodiment, the logic flow 500 dynamically sends a location query from a platform security engine of a mobile device at block 506. For example, a platform security engine 250 may send a location query to determine a location of the mobile device. In an embodiment, a location query may be dynamically sent in response to a change in location for a mobile device 310, 410. The location query may be received by an independent service vendor server 315 or a cloud computing server 415. In an embodiment, the location query may be received by an independent service vendor server 315. In an embodiment, the location query may be received by an enterprise server 315. In an embodiment, the location query may be received by a cloud computing sever. A cloud computing server 415 may be a server at a data center associated with cloud computing. In an embodiment, the data center may be an Intel® data center and/or a MacAfee® data center.

The logic flow 500 may receive a location response at block 508. For example, the location response may provide information that the mobile device 310 is in a private network. In an embodiment, a private network may include, but is not limited to, a corporate network or an enterprise network. For example, the location response may provide information that the mobile device 410 is in a public network, such as, but not limited to, the Internet. The embodiments are not limited to this example.

The logic flow 500 may determine whether the mobile device is located in a secure location based on the location response at block 510. For example, if the platform security engine 350 in the mobile device 310 receives information that the mobile device 310 is located on a private network, then the platform security engine 350 may determine that it is located in a secure location. In an embodiment, the platform security engine 350 may determine that it is in a secure location when it receives a location response stating that it is on a private network. In an embodiment, the platform security engine 450 may determine that it is in a non-secure location when it receives a location response stating that it is on a public network.

For example, if the platform security engine 350 receives information that the mobile device 310 is located on a private network, then the platform security engine 350 may determine that the mobile device 310 is located in a secure location. A private network may be determined to be a secure location as a private network may have secure firewalls, encryption and/or other types of security to prevent the mobile device from external attacks and threats.

For example, if the platform security engine 450 receives information that the mobile device 410 is located on a public network, then the platform security engine 450 may determine that the mobile device is located in a non-secure location. A public network may be determined to not be a secure location as a public network may have few or no protection against attacks from other devices.

Based on the location, a security policy may be set by a security component 270 for the mobile device. The security policy may be a set of rules to protect, detect and/or remove possible attacks and/or threats to the mobile device 310, 410. The security component 270 may determine a security policy for the mobile device 310, 410 based on whether the mobile device 310, 410 is in a secure location, such as a private network, or a non-secure location, such as a public network. In an embodiment, the security component 270 may set a security policy with a lenient security policy with a few rules when the mobile device 310, 410 is in a secure location, or the security component 270 may include a strict security policy with many rules when the mobile device 310, 410 is in a non-secure location.

FIG. 7 illustrates an embodiment of a logic flow 600 of setting a security policy. The logic flow 600 may be representative of some or all of the operations executed by one or more embodiments described herein.

In the illustrated embodiment shown in FIG. 6, the logic flow 600 may send a policy query at block 602. In an embodiment, the policy query may be sent via an application programming interface. For example, the security component 270 in the mobile device 310, 410 may send a policy query to the platform security engine 250 via an application programming interface. In an embodiment, the security component 270 may include, but is not limited to, a personal firewall, host data loss prevention (DLP) software, host intrusion prevention software (IPS), and/or antivirus software.

As discussed above in FIG. 6, in block 506, the platform security engine 250 may determine whether the mobile device 310, 410 is located in a secure location. The platform security engine 250 may receive a policy query via an application programming interface. In an embodiment, the application programming interface may allow the security component 270 to communicate with the platform security engine 250. In an embodiment, the application programming interface may determine when the security component 250 should send a policy query to the platform security engine 250. In an embodiment, the application programming interface may send a policy query to the platform security engine 250 when the mobile device 310, 410 changed locations. In an embodiment, the security component 270 on the mobile device 310, 410 may send a policy query to the platform security engine 250 to determine whether the mobile device 310, 410 is located in a secure location.

In an embodiment, prior to the security component 270 communicating with the platform security engine 250, the platform security engine 250 may authenticate with the security component 270. In an embodiment, the platform security engine 250 may use a self-generated RSA key pair to authenticate with the security component 270. In an embodiment, the security component 270 may securely handshake the platform secure engine 270 for authentication.

The logic flow 600 may receive a policy indication with information indicating whether the mobile device 310, 410 is located in a secure location at block 604. For example, the platform security engine 250 may send a policy indication, via the application programming interface, to the security component 270. In an embodiment, the security component 270 may receive the policy indication via an application programming interface. In an embodiment, the policy indication may state whether the mobile device 310 is located in a secure location. In an embodiment, the policy indication may be a policy response to the policy query. In an embodiment, the policy indication may include information indicating that the mobile device 310 is located in a secure location. In an embodiment, the policy indication may include information indicating that the mobile device 410 is located in a non-secure location. The embodiments are not limited to this example.

The logic flow 600 may set a security policy based on the policy indication at block 606. In an embodiment, the security component 270 may set a security policy based on the policy indication from the platform security engine 250. For example, the policy indication may include information indicating whether the mobile device 310 is located in a secure location and the security component 270 may set a security policy based on the mobile device 310 being located in a secure location.

The security policy may be a set of rules to protect, detect and/or remove possible attacks and/or threats to the mobile device. In an embodiment, the security policy may include a few rules and be a lenient security policy when the mobile device 310 is in a secure location. For example, if the mobile device 310 is on the private network, then the security policy may include fewer rules as the mobile device 310 is in a trusted network. In an embodiment, the security policy may have no rules when the mobile device 310 is in a trusted network. As the secure location may already have security measures to protect the mobile device 310 from attacks and/or threats, the mobile device does not need a strict security policy. The embodiments are not limited to this example.

In an embodiment, the security policy may include a strict security policy with many rules when the mobile device 410 is in a non-secure location. For example, if the mobile device 410 is on a public network, such as, but is not limited to, the Internet, then the security policy may include more rules as the mobile device 410 is not in a trusted network. A public network is not a secure location and/or environment as a public network may have few or no protection against attacks from other devices. Accordingly, a mobile device 410 on a public network may have a strict security policy to protect the mobile device 410. The embodiments are not limited to this example.

FIG. 8 illustrates an embodiment of a logic flow 700 of a location response. In an embodiment, the logic flow 700 establishes secure communication at block 702. In an embodiment, secure communication may be established between an independent service vendor server 315 and a platform security engine 350 of a mobile device 310. In an embodiment, secure communication may be established between a cloud computing server 415 and a platform security engine 450 of a mobile device 410. In an embodiment, the secure communication may include encryption, a certificate and/or a RSA key pair. In an embodiment, secure communication may be established using a secure socket layer (SSL) connection. In an embodiment, the secure communication may use a unique uniform resource locator or a predefined fully qualified domain name.

The logic flow 700 may receive a location query at block 704. In an embodiment, the independent service vendor server 315, such as, but not limited to, an enterprise server, may receive a location query. In an embodiment, a cloud computing server 415 may receive a location query. In an embodiment, the location query may ask where the mobile device 310, 410 is located.

The logic flow 700 may send a location response at block 706. In an embodiment, a location response may be sent to the platform security engine 250. The location response may include information indicating whether the mobile device 310, 410 is in a secure location or a non-secure location.

Figure 9:
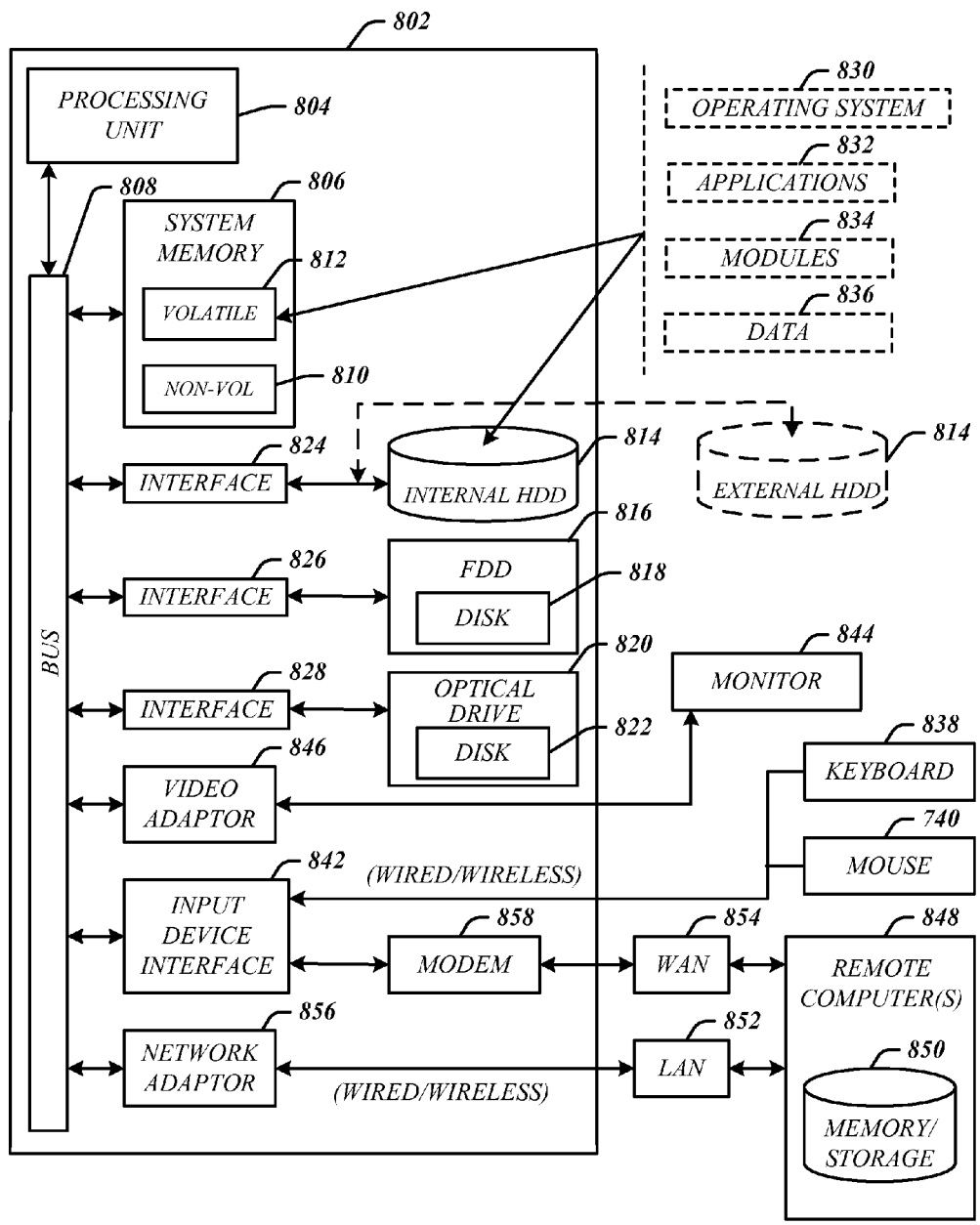
FIG. 9 illustrates an embodiment of a computing architecture.

FIG. 9 illustrates an embodiment of an exemplary computing architecture 800 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 800 may comprise or be implemented as part of an electronic device. Examples of an electronic device may include without limitation a mobile device, a mobile endpoint, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 9, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 9, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

The one or more application programs 832, other program modules 834, and program data 836 can include, for example, the security component.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 may be arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands. In the latter case, the wireless devices may include one more wireless interfaces and/or components for wireless communication, such as one or more transmitters, receivers, transmitter/receivers ("transceivers"), radios, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a microstrip antenna, a diversity antenna, a dual antenna, an antenna array, and so forth. In one embodiment, certain devices may include antenna arrays of multiple antennas to implement various adaptive antenna techniques and spatial diversity techniques.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The computer 802 may comprise or be implemented as a mobile broadband communications system. Examples of mobile broadband communications systems include, without limitation, systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In one embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e-2005) are Physical (PHY) layer specifications. WiMAX II is an advanced Fourth Generation (4G) system based on the IEEE 802.16j and IEEE 802.16m proposed standards for International Mobile Telecommunications (IMT) Advanced 4G series of standards. The embodiments are not limited in this context.

The computer 802 is operable to communicate, manage, or process information in accordance with one or more protocols. A protocol may comprise a set of predefined rules or instructions for managing communication among devices. In various embodiments, for example, the communications system 100 (from FIG. 1) may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

The computer 802 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a device to process the media information in a certain manner. The media and control information may be communicated from and to a number of different devices or networks.

FIG. 10 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 10, the communications architecture 900 comprises includes one or more clients 902 and servers 904. The clients 902 may implement the client systems 210, 310, 410. The servers 904 may implement the server system 215, 315, 415. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 806. The communications framework 906 may implement any well-known communications techniques and protocols, such as those described with reference to systems 200, 300, 400 and 800. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An article of manufacture comprising a non-transitory storage medium containing instructions that when executed enable a system to:
   determine that a mobile device has changed locations, the mobile device to comprise a platform security engine and a security component;
   authenticate, by the platform security engine, with a remote server to establish secure communication with the remote server based on the determination that the mobile device has changed locations;
   dynamically send a location query from the platform security engine to the remote server based on the determination that the mobile device has changed locations and in response to the establishment of secure communication with the remote server, the location query comprising a query of whether the mobile device is communicatively coupled to a private network or a public network;
   receive a location response from the remote server in response to the location query;
   determine, by the platform security engine, whether the mobile device is located in a secure location based on the location response; and
   send, by the platform security engine, an indication of whether the mobile device is located in a secure location to the security component; and
   set, by the security component, a security policy of the mobile device based on the indication.

2. The article of claim 1, the non-transitory storage medium comprising instructions that when executed enable the system to:
   determine that the mobile device has changed locations based on a receipt of an event trigger.

3. The article of claim 1, the non-transitory storage medium comprising instructions that when executed enable the system to:
   send, by the security component, a policy query to the platform security engine via an application programming interface.

4. The article of claim 1, the non-transitory storage medium comprising instructions that when executed enable the system to:
   receive, by the security component, a policy response from the platform security engine stating whether the mobile device is located in a secure location.

5. The article of claim 1, the non-transitory storage medium comprising instructions that when executed enable the system to:

adjust, by the security component, one or more of a hardware setting of the mobile device and a communication setting of the mobile device to set the security policy.

6. The article of claim 1, the non-transitory storage medium comprising instructions that when executed enable the system to authenticate with the remote server using a fully qualified domain name.

7. The article of claim 1, the remote server to comprise an independent service vendor server.

8. The article of claim 1, the remote server to comprise a cloud computing server.

9. The article of claim 1, the non-transitory storage medium comprising instructions that when executed enable the system to:
authenticate with the remote server using asymmetric RSA keys.

10. The article of claim 1, the non-transitory storage medium comprising instructions that if executed enable the system to:
determine that the mobile device is located in a secure location in response to a determination that the location response indicates that the mobile device is communicatively coupled to a private network.

11. The article of claim 1, the non-transitory storage medium comprising instructions that if executed enable the system to:
determine that the mobile device is located in a non-secure location in response to a determination that the location response indicates that the mobile device is communicatively coupled to a public network.

12. A method, comprising:
determining that a mobile device has changed locations, the mobile device to comprise a platform security engine and a security component;
authenticating, by the platform security engine implemented by a microprocessor, with a remote server to establish secure communication with the remote server based on the determination that the mobile device has changed locations;
dynamically sending a location query from the platform security engine to the remote server based on the determination that the mobile device has changed locations and in response to establishment of secure communication with the remote server, the location query comprising a query of whether the mobile device is communicatively coupled to a private network or a public network;
receiving a location response from the remote server in response to the location query;
determining, by the platform security engine, whether the mobile device is located in a secure location based on the location response; and
sending an indication of whether the mobile device is located in a secure location from the platform security engine to the security component; and
setting, by the security component implemented by the microprocessor, a security policy of the mobile device based on the indication.

13. The method of claim 12, setting the security policy comprising adjusting one or more of a hardware setting of the mobile device and a communication setting of the mobile device.

14. The method of claim 12, comprising:
receiving, by the security component, a policy response via an application programming interface; and setting, by the security component, the security policy based on the policy response.

15. The method of claim 12, the remote server to comprise an enterprise server.

16. The method of claim 12, the remote server to comprise a cloud computing server.

17. The method of claim 12, comprising:
authenticating with the remote server using a fully qualified domain name.

18. The method of claim 12, comprising:
authenticating with the remote server using asymmetric RSA keys.

19. The method of claim 12, comprising:
determining that the mobile device is located in a secure location in response to a determination that the location response indicates that the mobile device is communicatively coupled to a private network.

20. The method of claim 12, comprising:
determining that the mobile device is located in a non-secure location in response to a determination that the location response indicates that the mobile device is communicatively coupled to a public network.

21. A mobile device, comprising:
a communications component to exchange one or more wireless communications; a platform security engine implemented by a microprocessor operative to:
determine, in response to a receipt of an event trigger, that the mobile device has changed locations;
authenticate with a remote server to establish secure communication with the remote server based on the determination that the mobile device has changed locations;
dynamically send a location query to the remote server based on the determination that the mobile device has changed locations and in response to the establishment of secure communication with the remote server, the location query comprising a query of whether the mobile device is communicatively coupled to a private network or a public network;
receive a location response from the remote server in response to the location query; and
determine whether the mobile device is located in a secure location based on the location response; and a security component implemented by the microprocessor operative to:
receive, from the platform security engine, an indication of whether the mobile device is located in a secure location; and
set a security policy of the mobile device based on the indication.

22. The mobile device of claim 21, the platform security engine to determine that the mobile device is located in a secure location in response to a determination that the location response indicates that the mobile device is communicatively coupled to a private network.

23. The mobile device of claim 21, the platform security engine to determine that the mobile device is located in a non-secure location in response to a determination that the location response indicates that the mobile device is communicatively coupled to a public network.

24. The mobile device of claim 21, comprising:
a touch screen device.

25. The mobile device of claim 21, comprising:
a security component operative to:
send a policy query to the platform security engine via an application programming interface;

receive a policy response stating whether a current location is a secure location; and set a security policy for the mobile device based on the policy response.

26. The mobile device of claim 21, the communications component comprising:

at least one radio frequency (RF) transceiver; and at least one RF antenna.

27. The mobile device of claim 26, the communications component to communicate electromagnetic signals representing information.

28. The mobile device of claim 26, the communications component comprising:

a network interface card to notify the platform security engine when the mobile device changed locations.

* * * * *